United States Patent [19]

Brendl et al.

[11] 4,199,687

[45] Apr. 22, 1980

[54] SHEET FILM CHANGER

[75] Inventors: Rudolf Brendl; Johann Finkenzeller; Harry Kirsch; Karl Weiss, all of Erlangen, Fed. Rep. of Germany

[73] Assignee: Siemens Aktiengesellschaft, Berlin & Munich, Fed. Rep. of Germany

[21] Appl. No.: 933,076

[22] Filed: Aug. 11, 1978

[30] Foreign Application Priority Data

Aug. 31, 1977 [DE] Fed. Rep. of Germany ....... 2739244

[51] Int. Cl.[2] ........................................ G03B 41/16

[52] U.S. Cl. ........................................ 250/468; 250/521

[58] Field of Search ................ 250/468, 469, 470, 521

[56] References Cited

U.S. PATENT DOCUMENTS

| | | | |
|---|---|---|---|
| 3,775,613 | 11/1973 | Hommerin | 250/468 |
| 3,967,130 | 6/1976 | Decker | 250/468 |
| 3,991,317 | 11/1976 | Kunne et al. | 250/468 |

FOREIGN PATENT DOCUMENTS

| | | |
|---|---|---|
| 1140064 | 6/1963 | Fed. Rep. of Germany . |
| 2031386 | 9/1974 | Fed. Rep. of Germany . |

*Primary Examiner*—Alfred E. Smith
*Assistant Examiner*—T. N. Grigsby
*Attorney, Agent, or Firm*—Hill, Van Santen, Steadman, Chiara & Simpson

[57] ABSTRACT

The disclosure relates to a sheet film changer comprising a photographic exposure station, at least one supply magazine for the film sheets, and two discrete, synchronously driven conveyor belts which are disposed one above the other in the vicinity of the exposure station for conveying film sheets clamped between them. The conveyor belts transport the film sheets from a receiving location associated with the supply magazine to the photographic exposure station and then to a release location. In order to facilitate fluoroscopy when no film sheets are disposed in the path of rays, the conveyor belts themselves can be readily irradiated and are provided with intensifier foils only at specified sections. In order to achieve a greater flexibility with regard to the photographic conditions, at least two intensifier foils with different intensification properties are secured to each of the two conveyor belts. The sheet film changer is used for X-ray diagnosis.

15 Claims, 3 Drawing Figures

SHEET FILM CHANGER

BACKGROUND OF THE INVENTION

The invention relates to a sheet film changer comprising a photographic exposure station, at least one supply magazine for the film sheets, and two discrete, synchronously driven conveyor belts which are guided over rollers, and which are disposed one on top of the other for conveying the film sheets, clamped between them, from a receiving location associated with the supply magazine, to the photographic exposure station, and to a release location.

In the German Pat. No. 1,140,064, a sheet film changer is described wherein the individual film sheets, clamped between two conveyor belts, are conveyed from a supply magazine to a photographic exposure station, and from the photographic exposure station again back to a collector magazine via a shunt.

The conveyor belts bearing against the film sheet on both sides are coated with intensifier material on the surfaces facing the film sheet. At their two ends, they are each respectively wound up on a take-up roller. In the case of this sheet film changer, it is considered a disadvantage that only X-ray photographs can be prepared with the latter. Alone due to the as-specified-high absorption value of the intensifier material, but also due to the contact surface in the photographic exposure station, there is no possibility of installing an X-ray image intensifier and of transilluminating the examination area for fluoroscopy. For the purpose of fluoroscopy, the entire sheet film changer must be replaced by an image intensifier-television system. The examination cycle is thereby interrupted, and the alignment with the examination subject is lost.

From the German Auslegeschrift No. 2,031,386, an X-ray examination apparatus is known with which fluoroscopy can be carried out as well as with which, as needed, X-ray photographs can be produced. To this end, however, the particularly protective transport of the film sheets between conveyor belts enclosing the same on all sides is dispensed with. In addition, a special film carriage must be utilized which transports the film sheets, as required, into the photographic exposure position in front of the X-ray image intensifier.

SUMMARY OF THE INVENTION

The object underlying the invention consists in developing a sheet film changer which renders possible a fluoroscopy of the examination subject prior to and between the X-ray photographs to be prepared without a change in position, and nevertheless retains the protective transport of the film sheets between conveyor belts.

Accordingly, in the case of a sheet changer of the type initially cited, in accordance with the invention, the two conveyor belts are readily capable of being penetrated by radiation for the purpose of combination with a fluoroscopy installation, and they are provided with intensifier foils only at specified sections, the intensifier foils being oppositely disposed to one another, and being matched in their dimensions to the maximum photographic exposure format. The advantage connected herewith is that, pursuant to intentional fluoroscopy, sections of the conveyor belt are capable of being brought into the region of the photographic exposure position at any time through a mere forward— and return— winding of the conveyor belt, said sections manifesting a negligibly small absorption value for X-rays, and no longer obstructing fluoroscopy in the photographic exposure position. At the same time, there is also the related advantage that the requirement for intensifier material is markedly reduced.

The adaptability of the sheet film changer to the different examination conditions can be substantially increased if, in a particularly advantageous further development of the invention, at least two intensifier foils having different intensification properties are secured to each of the two conveyor belts. In this manner, the physician is able to select, in the case of each photographic exposure, in compliance with the diagnostic requirements, between the greatest possible outline sharpness (or definition) and the least possible dose burden on the patient.

In an expedient embodiment of the invention, the intensifier foils oppositely disposed to one another in the photographic exposure position of each conveyor belt can be matched, with regard to their properties, as a front and rear sheet. Through this means, every relative displacement of the conveyor belts and the intensifier foils is avoided, and, simultaneously, optimum photographic conditions are always obtained. The correct front sheet is always positioned in front of the matched rear foil.

The operational reliability of the sheet film changer can be significantly increased if, in an advantageous further embodiment of the invention, the individual intensifier foils are secured to the conveyor belt only at their edges which extend perpendicularly relative to the transport direction, pursuant to the interpositioning of at least one elastic strip. Securing the intensifier foils on the conveyor belt in this way makes it possible to keep tensile forces largely away from the intensifier foils if the conveyor belt— which is virtually unavoidable— is guided over rollers and is thus bent (or curved).

In a particularly advantageous further development of the invention, for the purpose of a stretched-out support-mounting of the intensifier foils in the quiescent position, the spatial intervals between the rollers on both sides of the quiescent position of the intensifier foils can be kept slightly greater than the lengths of the intensifier foils in the transport direction, and the intermediate spaces between the intensifier foils can be kept slightly greater than half the circumferences of the utilized rollers. As is known, intensifier foils are sensitive to bending, because, in the case of the elongation connected therewith, fine cracks (or fissures) result in the active intensification layer. These fissures render possible the further transmission (or relaying) of light transversely to the direction of the X-radiation, and thus reduce the image definition (or sharpness). The indicated spatial intervals between the rollers lead to the result that the conveyor belts are stretched out flat (or straight) in the ready position as well as in the photographic exposure position, and that they are briefly guided about one or more rollers only during transport. The life of the intensifier foils is thereby substantially increased.

The handling of the sheet film changer can be significantly facilitated if, in a particularly advantageous further development of the invention, the position of each intensifier foil on the conveyor belt is characterized by at least one machine-readable marking. The condition provided hereby is that the selected intensifier foil combination with the interposed film sheet can be allowed to run, e.g. in response to manual pressing of a key, exactly into the photographic exposure position or into a quiescent position in an automatic manner.

In an expedient embodiment of the invention, the markings of the individual intensifier foils can be placed on different tracks of the conveyor belt. This makes it possible, through a mere allocation of read units, to effect a selection between available intensifier foils.

In a particularly advantageous further development of the invention, there can be allocated to each selectable film format and to each selectable intensifier foil, a special corresponding ready-position of the two conveyor belts, and thus a special marking matched to each ready position, and a read-head matched to the marking, by means of which marking and read head the centering of the selected film sheet relative to the respective intensifier foil is guaranteed. It is thereby possible to establish the direction of the central axis of the examination field independently of the selected film format; i.e., always centrically relative to the photographic exposure position. For, in this manner, it is ensured that the incoming film sheet, pursuant to switching on of the supply magazine, and pursuant to a simultaneous starting-up of the conveyor belts, taking into account its format, is pushed centrically relative to the selected intensifier foil combination between the converging conveyor belts, (the foils being thereafter positioned centrically relative to the photographic exposure position).

In an expedient embodiment of the invention, the markings can consist of reflection strips placed on the conveyor belts to which reflection strips there are allocated correspondingly matched read heads— consisting of a radiation source and radiation detector— for stopping the conveyor belts. A construction such as this can be carried out relatively simply with conventional components if a type of radiation which is harmless to the utilized film material— such as e.g. red light— is used. Since the reflection strips are expediently placed on the side of the conveyor belt not facing the film, an arbitrary different type of radiation can also be utilized insofar as the latter cannot penetrate the material of the conveyor belts and expose the intermediately disposed film sheets.

In another expedient embodiment of the invention, the markings can consist of magnetizable material placed on the conveyor belts to which markings are allocated correspondingly matched detectors for stopping the conveyor belts. A greater freedom in the selection of the material of the conveyor belts is hereby rendered possible.

A particularly advantageous construction is obtained, if, in a further development of the invention, terminate (non-endless) conveyor belts are utilized. It is hereby possible to exercise economy in not utilizing return sections of the conveyor belts.

In an expedient embodiment of the invention, the conveyor belts can be guided in the photographic exposure position via a surface which is unidimensionally curved in the transport direction, and the contact pressure of the film sheets on the intensifier foils can take place by means of tensioning the conveyor belt. This type of contact pressuring of the film sheets against the conveyor belts and the inlaid intensifier foils results in a contact pressure force which is uniform over the entire surface, and avoids costly contact pressure plates obstructing fluoroscopy. Thus, this construction permits fluoroscopy through the photographic exposure position, as needed, in the case of correspondingly rewound conveyor belts.

Further details of the invention shall be explained in greater detail on the basis of the sample embodiment illustrated in the accompanying sheet of drawings; and other objects, features and advantages will be apparent from this detailed disclosure and from the appended claims.

DETAILED DESCRIPTION

Figure 1:
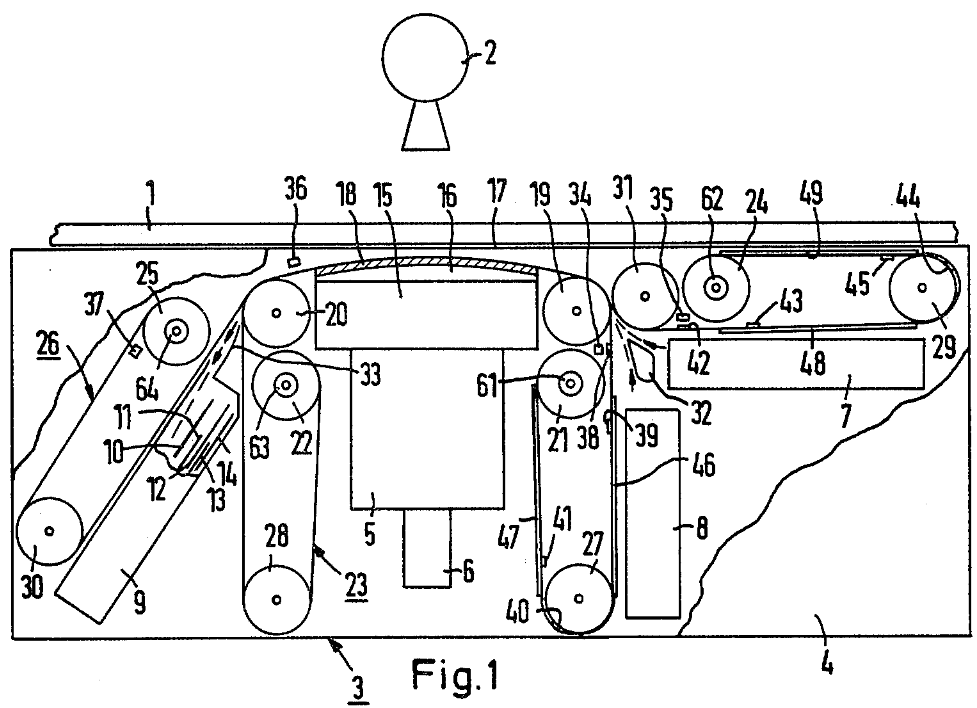
FIG. 1 shows a schematic illustration of the sheet film changer in section.

In FIG. 1, a patient support table 1 is illustrated, above which an X-ray tube 2 and below which an inventive sheet film changer 3 are arranged. In the opened-up housing 4 of the sheet film changer, an X-ray image intensifier 5— centered (or aligned) in relation to the X-ray tube— with a connected television camera 6 can be recognized. In FIG. 1, on the right of the X-ray image intensifier there are disposed two supply magazines 7, 8, for film sheets of a different format. On the left side of the image intensifier in FIG. 1, a collector magazine 9 for the different format exposed film sheets 10, 11, 12, 13, 14 is admitted in housing 4 of sheet film changer 3. The fluorescent layer (not illustrated) of the inlet fluorescent screen 15 of X-ray image intensifier 5 is disposed directly beneath the curved covering 16— facing X-ray tube 2— of the X-ray image intensifier, only a few centimeters beneath the housing wall 17 facing X-ray tube 2. The covering 16 of the inlet fluorescent screen of X-ray image intensifier 5 is covered by a layer 18 of X-ray transmissive foam material.

On the side of the collector magazine 9 and on the side of the two supply magazines 7, 8, there is disposed one path change (deflection) roller 19, 20, each, next to the inlet fluorescent screen 15 of the X-ray image intensifier, and providing for a change in the direction of film sheet transport. These path change rollers are mounted such that their circumference coincides with a tangent line placed on the marginal region of covering 16 of the inlet fluorescent screen. Directly beneath these path change rollers 19, 20, there is mounted at both sides of X-ray image intensifier 5, one windup roller 21, 22, for each of the ends of the lower conveyor belt 23 (which faces the X-ray image intensifier) and, directly adjacent these two path change rollers 19, 20, there is mounted one windup roller 24, 25, for the two ends of the upper conveyor belt 26 (which faces the X-ray tube). Between the path change rollers 19, 20, and the windup rollers, both conveyor belts 23, 26, are additionally guided via a further auxiliary roller 27, 28, 29, 30, removed from the respective windup roller by at least one intensifier foil length. The upper conveyor belt 26 is additionally guided, on the side of supply magazine 7, 8, via a contact pressure roller 31 which presses it against the right path change roller 19 in the Figure. Between the two supply magazines 7, 8, there is disposed a deflection member 32 by means of which the film sheets, ejected from the supply magazines, at the receiving location are guided between the two conveyor belts 23, 26 as they converge at path change roller 19. On the side of collector magazine 9, there is disposed, at the release location, where the upper and the lower conveyor belts are guided apart, a guide plate 33 by means of which the film sheets released there are guided into the collector magazine.

In FIG. 1, it is possible to recognize, beneath, and at the right, adjacent the path change roller 19, as well as above the path change roller 20, and adjacent the left windup roller 25, one read unit 34, 35, 36, 37, in each instance, for the purpose of scanning the markings 38, 39, 40, 41, 42, 43, 44, 45, for the intensifier foils 46, 47, 48, 49, which markings are applied on both conveyor belts 23, 26.

Figure 2:
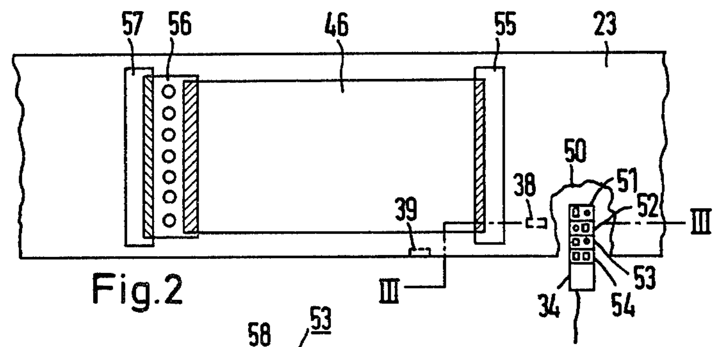
FIG. 2 illustrates a plan view of a section of a conveyor belt— facing the film sheet— with an intensifier foil attached thereupon.

FIG. 2 shows, in an enlarged illustration, the mounting of the intensifier foil 46 on the conveyor belt 23, and the arrangement of the markings 38, 39, applied on different tracks of the conveyor belt, in relation to the position of the intensifier foil. It is also possible to recognize through a broken away region 50 of the conveyor belt 23, that the read unit 34 contains, in an adjacent arrangement, four discrete read heads 51, 52, 53, 54. Each of these read heads is allocated to a specified track on the conveyor belt. As can be clearly recognized in FIG. 3, the markings such as 38 are applied, in each instance, on the reverse side of the conveyor belts 23, 26, not facing the intensifier foils. In FIG. 2, it can be clearly seen that the intensifier foil 46, at its one frontal end, is cemented with an adhesive strip 55 directly onto the conveyor belt 23. On its opposite end, however, pursuant to the interposition of an elastic strip 56 provided with holes, it is secured to conveyor belt 23 with an adhesive strip 57.

Figure 3:
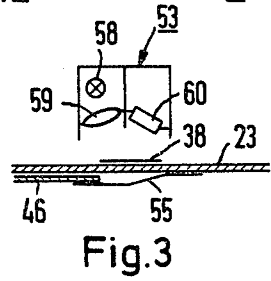
FIG. 3 shows a section along lines III—III of FIG. 2.

FIG. 3, in its sectional illustration, permits the recognition of the construction of the read unit 34 consisting of four read heads. The housing of each of the read heads 51, 52, 53, 54, is constructed in a two-chamber fashion, and bears, in the one chamber, a light source 58 with a lens 59, and, in the other chamber, a photoelectric cell 60. The lens is aligned (or orientated) such that the light projected from the light source onto a reflection strip (such as that at 38) fixed onto the conveyor belt as a marking, is reflected onto the photoelectric cell. Instead of a reflection strip, a magnetic tape could be utilized, and instead of the read head, a corresponding detector could be utilized.

When the sheet film changer 3 is switched off, both conveyor belts 23, 26 are disposed in a waiting (or quiescent) position. The conveyor belts are illustrated in this position in FIG. 1. In the quiescent position, the two conveyor belts are wound up to such an extend on the two right windup rollers 21, 24, in FIG. 1, that both intensifier foils 44 through 47 of each conveyor belt 23, 26, are disposed on the straight sections between the respective windup roller 21, 24, and auxiliary roller 27, 29, or the auxiliary roller and the roller 19, respectively. The markings 38, 42 for the larger film format of the front (or leading) intensifier foil 46, 48, (with respect to the sheet feed transport direction of the belts) is disposed in front of the read unit 34, 35 in the quiescent position. In this position, no intensifier foils are in the photographic exposure position. Accordingly, fluoroscopy can be carried out through the conveyor belts 23, 26, which are readily capable of penetration by radiation, without any parts of the sheet film changer manifesting themselves in an interfering fashion.

Thus, in setting the sheet film changer 3 in operation, an intensifier foil combination is selected, and the drives 61, 62, 63, 64, of the windup rollers 21, 22, 24, 25, are switched on for such a length of time until the front (or leading) markings 38 or 40 and 42 or 44, of the selected intensifier foils in the read heads of the read units 34, 35, associated with the quiescent position, generate the switchoff signal. If, in addition, the smaller film format is selected, both conveyor belts will then additionally advance to such an extent until the respective rear marking 39 or 41 and 43 or 45, of the selected foil combination is disposed in front of the read unit 34, 35, which defines the quiescent position. The selected intensifier foils are now disposed in the ready position matched to the selected smaller film format. For the front (or leading) intensifier foil pair and the larger film format, this ready position is identical to the quiescent position shown in FIG. 1, such that fluoroscopy can be carried out also in the latter position.

The different (or discrete) ready positions are laid out such that when, pursuant to triggering the X-ray photograph, a film sheet is ejected from the preselected supply magazine, and the conveyor belts simultaneously start to run, the ejected film sheet at the receiving location at the path change roller 19 is centrically clamped between the preselected intensifier foils. As soon as the film sheet has reached the photographic exposure position, and the markings 38 or 40 and 42 or 44, of the selected foil combination (said markings being associated with the large film format) are disposed in front of the read unit 36 adjacent the left path change roller 20, the windup roller 24 of the upper conveyor belt 26, disposed on the right side of the X-ray image intensifier 5, is stopped. The drive 64 of the windup roller 25, disposed on the left side of the X-ray image intensifier, of the upper conveyor belt 26 remians switched on even if with reduced voltage. The drives 61, 63, of the lower conveyor belt 23 are switched off. By means of the thus-effected tensioning of the upper conveyor belt, the latter, together with the underlying film sheet, is pressed on the lower conveyor belt, and against the foam material layer 18 on the covering 16, provided with a unidimensional curvature in the transport direction, of the inlet fluorescent screen of the X-ray image intensifier 5. In this position, the X-ray tube is connected to voltage with minimal delay. The film sheet is exposed.

Following the exposure of the film sheet, the blocking of the right windup roller 24 of the upper conveyor belt 26 is cancelled, and both conveyor belts are further transported by the two left windup rollers 22, 25, until the exposed film sheet on the left side of the X-ray image intensifier is released by the conveyor belts diverging there at the release location, and falls into the collector magazine. Upon reaching the left extreme position of the conveyor belts, when the first marking 42 of the (in the transport direction) frontal intensifier foil 48 is disposed in front of the radiation detector 37 at the (in the Figure, left) windup roller 25, both conveyor belts are again wound back onto the right windup roller until they have reached their intially described ready position. There, the markings 38, 42 disposed in transport direction before the front (or leading) intensifier foil 46, 48, switch off the drives via the read units 34, 35 associated with the ready position. In this position of the conveyor belts, the intensifier foils 46, 47, 48, 49, are again disposed in a stretched-out position between the right contact pressure rollers 21, 24 and the auxiliary rollers 27, 29, or between the auxiliary rollers 27, 29, and the following path change rollers 19, 31, respectively. At the same time, there is disposed, between the inlet fluorescent screen 15 of X-ray image intensifier 5 and the X-ray tube 2, one section of the conveyor belt in each instance, on which no intensifier sheet is disposed and which is readily capable of irradiation and thus does not obstruct the fluoroscopy.

In the case of this sheet film changer, the intensifier foils are in the stretched state in the readiness as well as in the receiving position. During the photographic exposure, also, the particular intensifier sheet pair not required (at that time) is stretched out laterally of the path change rollers 19, 20, either to the right or to the left of the X-ray image intensifier 5. The life of the intensifier foils is thereby substantially increased. Through the elastic strip 56, with which the one edge of the intensifier foils is secured on the conveyor belt, stresses which otherwise could be exerted on the intensifier foils upon passing over the path change and auxiliary rollers, are avoided. The path change and auxiliary rollers, in addition, are always arranged on the reverse side of the conveyor belt, such that the intensifier foils cannot come into contact with the rollers. The intensifier foils applied on both conveyor belts each have different amplification properties. That particular intensifier foil which is more frequently used; i.e. the one with the greater intensification property, will preferably be secured on the conveyor belt in the transport direction in front of the one with the lesser intensification property. In this manner, the conveyor belts need be transported shorter distances and accordingly, need be deflected less frequently.

It will be apparent that many modifications and variations may be effected without departing from the scope of the novel concepts and teachings of the present invention.

We claim as our invention:

1. A sheet film changer comprising a photographic exposure station, at least one supply magazine for the film sheets, two discrete, synchronously driven conveyor belts, guided over rollers, disposed one above the other at a sheet transport path for conveying the film sheets, clamped between them, from a receiving location associated with the supply magazine, to a photographic exposure station, and to a release location, characterized in that the two conveyor belts (23,26) for the purpose of combination with a fluoroscopy installation (5, 6, 15, 16), are readily capable of irradiation, and are provided with intensifier foils (46, 47, 48, 49) only at sections which are matched in their dimensions to the maximum photographic exposure format.

2. A sheet film changer according to claim 1, characterized in that at least two intensifier foils (46, 47, 48, 49) with different intensification properties are secured on each of the two conveyor belts (23, 26) for selective positioning at the photographic exposure station.

3. A sheet film changer according to claim 1, characterized in that respective intensifier foils (46, 48; 47, 49) are carried by the respective belts (23, 26) for positioning, oppositely disposed to one another, in the photographic exposure position, the respective intensifier foils (e.g. 48, 46) being adapted with regard to their properties, as the front and rear intensifiers for a film sheet therebetween at the photographic exposure station.

4. A sheet film changer according to claim 1, characterized in that the individual foils (46, 47, 48, 49) are mounted only at their edges aligned perpendicularly relative to the transport direction, on the respective conveyor belt (23, 26), with interpositioning of at least one elastic strip (56).

5. A sheet film changer according to claim 1, characterized in that, for the purpose of the stretched out support-mounting of the intensifier foils (46, 47, 48, 49), in the quiescent position, the spatial intervals between rollers (21, 22, 24, 25, 27, 28, 29, 30) on both sides of the quiescent position of the intensifier foils are maintained slightly greater than the lengths of the intensifier foils in the transport direction, and that the intermediate spaces between the intensifier foils are maintained slightly larger than half the circumferences of the rollers employed.

6. A sheet film changer according to claim 1, characterized in that the position of each intensifier foil (46, 47, 48, 49) on the conveyor belt (23, 26) is characterized by at least one machine-readable marking (38–45).

7. A sheet film changer according to claim 6, characterized in that the markings (38–45) for the discrete intensifier foils (46, 47, 48, 49) are applied on the discrete tracks of the conveyor belt (23, 26).

8. A sheet film changer according to claim 6, characterized in that there are associated with each selectable film format and each selectable intensifier foil (46, 47, 48, 49) a particular ready position of the two conveyor belts (23, 26), and thus a particular marking (38–45) matched to the ready position, and a read head (51, 52, 53, 54), matched to the marking, by means of which the centering of the selected film sheet (10–14) relative to the respective intensifier foil is guaranteed.

9. A sheet film changer according to claim 6, characterized in that the markings (38–45) consist of reflection strips applied on the conveyor belts (23, 26), with which there are associated correspondingly adapted read-heads (51, 52, 53, 54) for stopping the conveyor belts, said read-heads each comprising a radiation source (58) and a radiation detector (60).

10. A sheet film changer according to claim 6, characterized in that the markings consist of magnetizable material applied on the conveyor belts (23, 26), with which correspondingly matched detectors are associated for the purpose of stopping the conveyor belts.

11. A sheet film changer according to claim 1, characterized by the utilization of terminate conveyor belts (23, 26).

12. A sheet film changer according to claim 1, characterized in that the conveyor belts (23, 26) in the photographic exposure position are guided over a surface (16), provided with a unidimensional curvature in the transport direction, and that the contact-pressuring of the film sheets (10–14) against the intensifier foils (46, 47, 48, 49) proceeds by means of conveyor belt tensioning.

13. A sheet film changer according to claim 12, characterized in that, for the purpose of contact-pressuring the film sheets (10–14) against the intensifier foils (46, 47 48, 49), the one of the wind-up rollers (24) of the conveyor belt (26), facing the X-ray source (2), is blocked in the photographic exposure position, and the other wind-up roller (25) of the same conveyor belt is simultaneously driven in the direction for tensioning such belt (26).

14. A sheet film changer according to claim 12, characterized in that the curved surface (16) is covered by a layer of foam material (18).

15. A sheet film changer according to claim 12, characterized in that the curved surface (16) is formed by the covering of the inlet fluorescent screen (15) of the X-ray image intensifier (5).

* * * * *